MOORE & ELLIOT.
Lantern for Marine Telegraph.
No. 35,322.  Patented May 20, 1862.
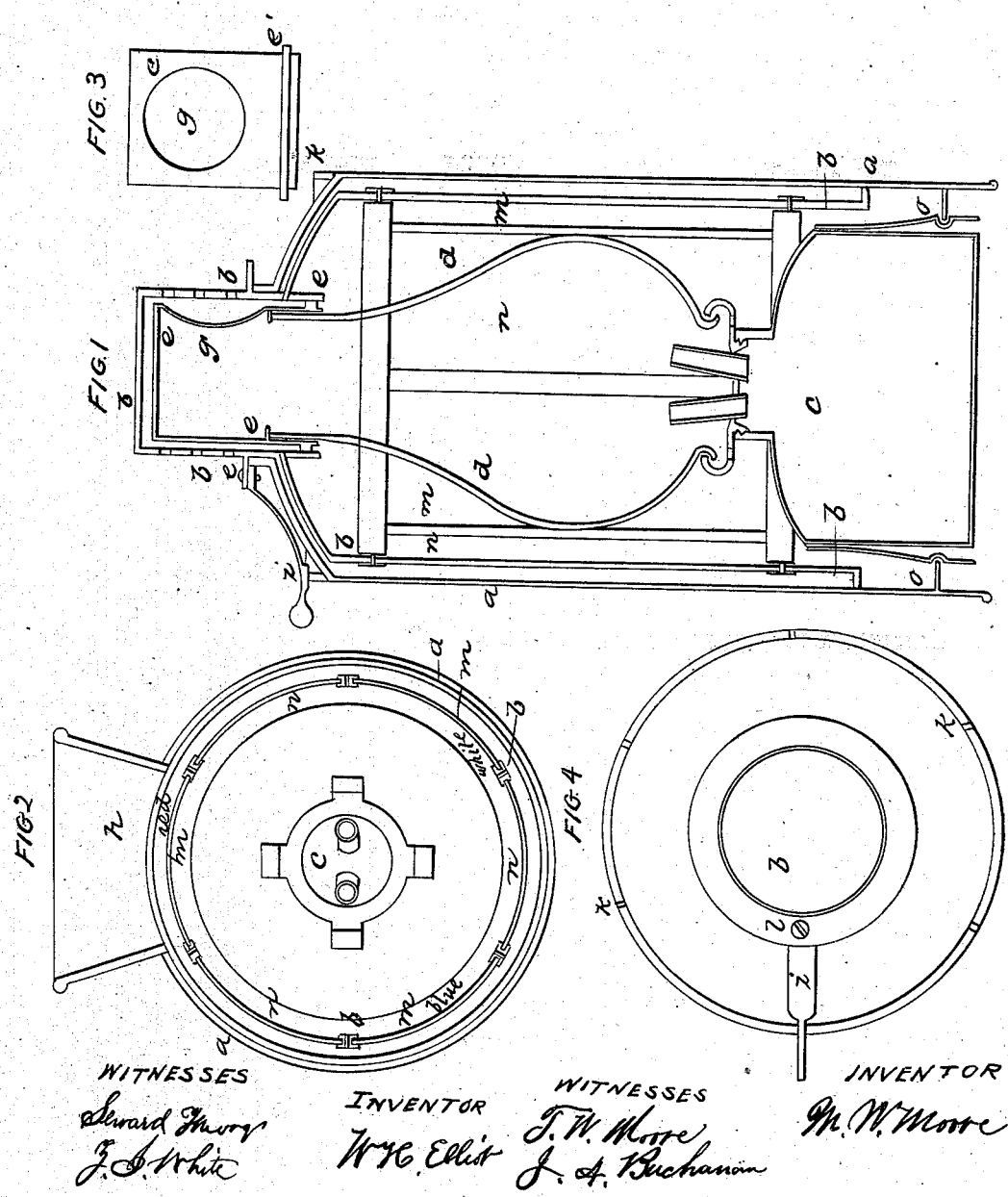

UNITED STATES PATENT OFFICE.

JOHN W. MOORE AND WILLIAM H. ELLIOT, OF PLATTSBURG, NEW YORK.

IMPROVEMENT IN LANTERNS FOR MARINE TELEGRAPHS.

Specification forming part of Letters Patent No. 35,322, dated May 20, 1862.

*To all whom it may concern:*

Be it known that we, JOHN W. MOORE and W. H. ELLIOT, of Plattsburg, in the county of Clinton and State of New York, have invented a new and Improved Marine-Telegraph Lantern; and we do hereby declare that the following is a full and exact description thereof, reference being had to the accompanying drawings, and to the letters of reference marked thereon.

Similar letters of reference indicate the same devices in all the figures.

To enable others skilled in the arts to make and use our invention, we will proceed to describe its nature, construction, and operation.

The nature of our invention consists in the employment of several colored glasses with one light, so arranged in relation to the reflectors and the other portions of the lantern that the lantern may be made to produce lights of several different and distinct colors in any required order.

*a* represents the outer case or shell of the lantern; *b*, revolving portion of the lantern; *c*, lamp for producing the light; *d*, chimney; *e*, cap of the same; *f*, openings in the outer case for the draft; *g*, opening in the side of the chimney-cap for the same purpose; *h*, bonnet around the opening *j* in the outer case; *i*, spring attached to the inner or revolving lantern *b*, by which it is revolved; *k*, notches upon the outer case, into which spring *i* falls, so as to hold the lantern in any desired position; *m m m*, red, white, and blue lights of glass; *n n n*, reflectors placed between the lights of glass; *o*, spring-catches for holding the lamp in the lantern.

The object of this invention is to combine in one lantern the necessary means of making several different-colored lights for marine-telegraphing, in such a manner that a communication may be made with greater facility and accuracy than can be done with several lanterns each producing only a single color.

We produce by our improved lantern lights of the necessary colors, by bringing before the opening *j* several lights of glass of different colors—*i. e.*, when we wish to produce a red light, we revolve the lantern so as to bring a red glass into the opening *j*, when the lantern will exhibit a red light, and to produce a blue or white light we bring a blue or white glass into that opening.

In use the outer case, lamp, chimney, and chimney-cap remain stationary, while the colored glass and the reflectors are caused to revolve by means of spring *i*, so as to bring the colored glasses in the order in which they are required into the opening *j*, which is turned toward the party receiving the telegram. Opposite to each glass in the revolving lantern there is a reflector, so that when one of the glasses is brought before the opening one of the reflectors will be brought exactly opposite to it, as may be seen by reference to Figure 2, which is a horizontal section of our improved lantern. It may also be seen that the inner or revolving portion of our improved lantern is divided into six nearly equal spaces, three of which are filled with glass of different colors and three with the reflectors or some other opaque substance arranged alternately with the colored glasses, and as this portion of the lantern revolves before opening *j*, which is about the size of the spaces, it is clear that after one colored glass has been shown and before another can be seen the opening *j* must be completely closed by an intervening opaque division. By this arrangement of these devices it is impossible to blend the colors by showing two at the same time.

The bonnet *h* is made to project so far from the lantern that the light cannot be seen, except in the direction in which the opening is turned, so that the fact that a telegram was being sent could not be known by an enemy unless he was directly before the lantern.

By revolving the lamp within the lantern the chimney and its cap may be turned around, so as to bring the opening *g* in the cap to the leeward side of the lantern, by which means the draft of the lamp is protected from the wind, which may blow through the openings *f* upon the windward side.

This lantern may be provided with a handle attached to the outer shell in any convenient position, if desired.

Fig. 1 is a vertical section of our improved lantern, and Fig. 4 is a plan of the same. Fig. 3 is an elevation of the chimney-cap.

Having fully described our invention, what we claim, and wish to have secured to us by Letters Patent, is—

1. The alternate arrangement of the colored glasses $m$ with the opaque divisions $n$, when these are employed with opening $j$ in the outer shell, $a$, as and for the purpose specified.

2. The alternate arrangement of the glasses $m$ and reflectors $n$ in the revolving lantern $b$, as and for the purpose specified.

JNO. W. MOORE.
WM. H. ELLIOT.

Witnesses for Moore:
  T. W. MOORE,
  J. A. BUCHANAN.

Witnesses for Elliot:
  SEWARD MERRY,
  Z. I. WHITE.